Oct. 8, 1957     T. PLETSCHER     2,809,053
BICYCLE FRAME WITH LUGGAGE CARRIER
Filed March 15, 1955
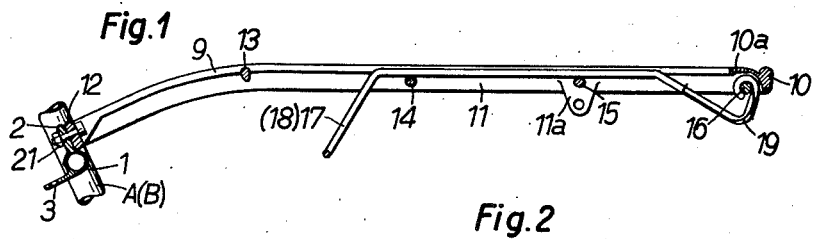
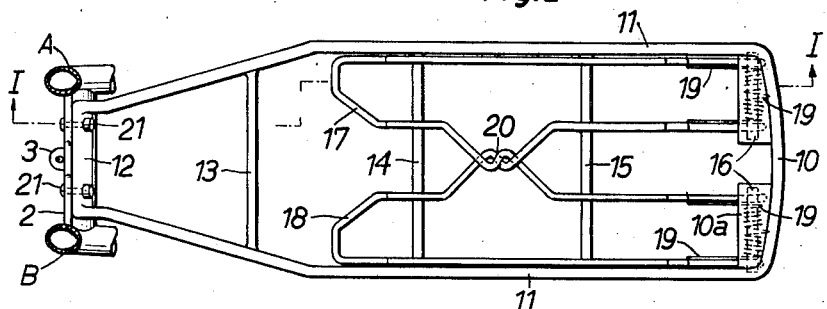
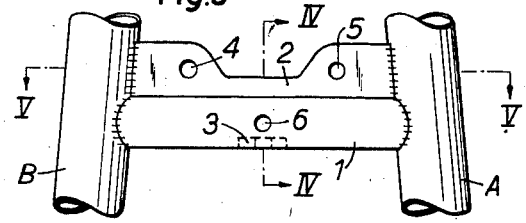 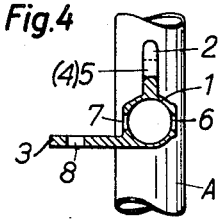
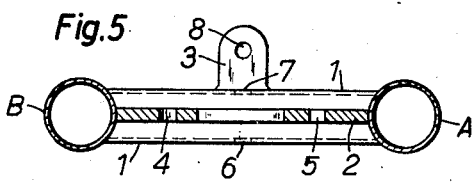 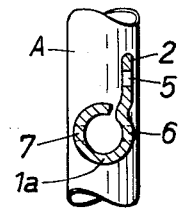
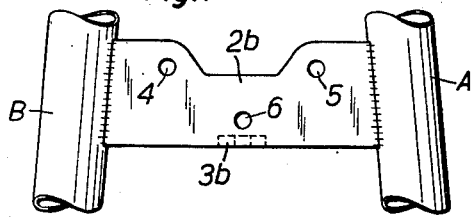 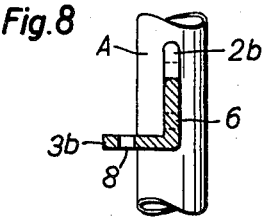
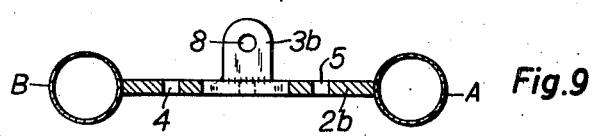
INVENTOR:

United States Patent Office 2,809,053
Patented Oct. 8, 1957

2,809,053
BICYCLE FRAME WITH LUGGAGE CARRIER
Theodor Pletscher, Marthalen (Zurich), Switzerland
Application March 15, 1955, Serial No. 494,334
Claims priority, application Switzerland September 18, 1954
5 Claims. (Cl. 280—281)

This invention relates to bicycle frames, and more particularly to luggage carriers for bicycle frames.

It is well known to provide the frames of bicycles and motor bicycles with clips having a portion directed backwardly in the longitudinal direction of the vehicle. More particularly, such clips are attached to the two fork arms of the rear wheel fork of the frame and are each adapted to receive one free end of the luggage carrier or grid which is removably secured to the frame by means of a screw directed transversely with respect to the longitudinal axis of the vehicle. Such a fastening has the prime disadvantage that, with heavily loaded luggage grids, the connection between the fish plate and the flattened end of the luggage grid cooperating therewith may give way whereby the clamping connection disposed at a certain distance from the shoulder cross piece of the rear fork connecting the fork arms may slide downwardly. In order to avoid this disadvantage it has been proposed to fix the lobes or lugs serving to secure the luggage grid directly to or into the fork arms by means of a brazing process. The first variant had the disadvantage of an easy breaking of the brazing connection resulting in substantial damaging of the varnish of the bicycle frame during the re-brazing. The second variant resulted in a weakening of the fork arms, which was also disadvantageous.

In a more recent device for fastening a luggage grid to a bicycle frame, an attempt has been made to overcome the mentioned disadvantages by entering, between the fork arms and the ends of the bridge connecting same, a pair of connecting lugs provided with a boring, each lug serving to receive a screw for fastening the luggage grid. In this device these lugs are brazed or welded or made of one piece with the bridge connecting the fork arms.

From a commercial point of view, this arrangement has no advantages as the connecting lugs must be brazed in separately, while the manufacture of the lugs of one piece with the connecting bridge necessitates an expensive heat treatment of the material.

A further disadvantage, which is common to all above-mentioned arrangements lies in the great danger of breaking of the freely projecting connecting lugs or of the free ends of the luggage grid connected thereto.

The main object of the present invention is to provide a vehicle frame with a luggage grid in which the aforementioned disadvantages are avoided in that it does not comprise any free lugs and in that the screws connecting the luggage grid with the vehicle frame extend in a plane which is parallel to the longitudinal axis of the vehicle.

According to the present invention this is attained by arranging the connecting bridge or shoulder cross piece between the two rear fork arms as an abutment or support for a transversally extending leg of the luggage grid, itself being a closed supporting frame, and in that the cross piece and the said leg of the luggage grid are provided with cooperating borings by means of which the luggage grid may be secured to the vehicle frame by screw bolts extending in a parallel plane to the longitudinal axis of the vehicle.

Other features and advantages of the present invention will become apparent from the following description of preferred embodiments thereof given by way of example and in which reference will be made to the accompanying drawings in which:

Fig. 1 is a section along the line I—I of Fig. 2, through the cross piece connecting the two fork arms of the rear fork of a bicycle frame and through the luggage grid secured to this cross piece.

Fig. 2 is a plan view of the apparatus in Fig. 1.

Fig. 3 represents in enlarged scale the connecting bridge or cross piece as seen normal to Figs. 1 and 2.

Figs. 4 and 5 are horizontal and vertical sections, respectively, along the lines IV—IV and V—V of Fig. 3.

Fig. 6 is a cross section through a modification of the shoulder cross piece of the rear fork, and Figs. 7–9 show another modification of this cross piece, respectively in front, side and top view.

In the embodiment illustrated in Figures 1 to 5 the shoulder cross piece connecting the rear fork arms A, B of the bicycle frame are made of one piece such as, for example, by means of a cold working process. This cross piece comprises a tubular portion 1 provided with an upper longitudinal flange 2 and a lower tangentially directed lug 3 extending at right angle to the longitudinal flange 2. The latter has its end portions widened and provided with openings 4 and 5 adapted to receive screws extending in parallel to a vertical plane comprising the longitudinal axis of the bicycle frame. The tubular portion 1 has in its middle portion between the lug 3 and the longitudinal flange 2 an opening 6 corresponding to a diametrically opposite opening 7.

These openings 6, 7 serve to receive a screw by means of which a rim or felloe brake may be fastened in a way known per se. As the cross piece is formed by a cold working process resistant material may be used therefor so that the heretofore necessary reinforcement of the boring for the rim brake by means of a bushing may be avoided. The lug 3 is provided with a boring 8. The described cross piece has its ends directly connected by means of a welding seam to the rear fork arms A, B of the bicycle frame.

The luggage carrier comprises a cast elongated supporting frame 9 having one of its two shorter sides constituted by an arcuate leg 10 connecting the two parallel longer longitudinal legs 11. At the other end, the two legs 11 converge towards a transversely extending leg 12 so that the supporting frame 9 is closed in itself. Bridges 13, 14, 15 extending parallel to the leg 12 divide the surface enclosed by the supporting frame 9 so as to form a luggage grid and reinforce the frame. The two longitudinal legs 11 of the supporting frame 9 each have a downwardly directed projection 11a (Fig. 1) for removably connecting one end of a support the other end of which is connected or supported on the axle of the rear wheel of the bicycle. The supporting frame 9 moreover comprises two coaxial bolts 16 arranged on the longitudinal legs 11 and directed towards each other in parallel with the reinforcement bridges 13—15. Two clamping stirrups are rotatably arranged with the ends of their free arms on the two bolts 16. These stirrups 17 and 18 are subjected to the influence of a pair of torsional springs 19 arranged one on each of the bolts 16 and having their one ends engaging the clamping stirrups and their other ends abutting against the transversal leg 10 of the luggage carrier. Both springs 19 are covered by a cover element 10a. The two adjacent arms of the stirrups are twisted as at 20 so that the two stirrups together form one clamping device. Of course these two arms could be connected in a different way from that shown such as, for example, by welding, brazing or by means of a connecting clip. As seen in Figs. 1 and 2 the clamping stirrups 17, 18 are supported in their rest position on the transverse bridges 14, 15 of the supporting frame 9. The two springs 19 force the stirrups towards these bridges 14 and 15, and the arrangement is such that the spring-loaded stirrups cooperate with the grid formed by the elements 10, 11, 14 and 15 for clamping goods on the luggage carrier.

As seen in Figs. 1 and 2, the supporting frame 9 of the luggage carrier is releasably connected with the bicycle frame by means of two bolt screws 21 extending in longitudinal direction of the vehicle through the leg 12 and through the openings 4 and 5 of the longitudinal flange 2 of the shoulder cross piece between the rear fork arms. As is clearly seen in the figures, the cross piece between the fork arms serves as a support for the leg 12 of the luggage grid. The lug 3 of the tubular portion 1 serves to fasten the rear mud guard (not shown), which is secured in a well-known manner to this lug by means of a bolt or screw. As already mentioned the openings 6 and 7 in the tube element 1 may receive a bolt or screw serving to secure the rear rim brake.

The described seam connection between the shoulder cross piece and the bicycle frame is easy to make at low cost and does not weaken the fork arms A, B. Likewise, the connection of the luggage carrier to this cross piece which constitutes a strong support for the supporting frame 9 is very simple.

The connection between the supporting frame 9 of the luggage carrier and the cross piece could of course be made different from the one described hereinbefore such as, for example, by means of two connecting legs provided at the supporting frame or by means of a fork arrangement which may be such that the supporting frame 9 may be hooked into the cross piece connecting the rear fork arms of the bicycle frame.

In addition to the lower lug 3 also the upper longitudinal flange 2 could have a tangential position.

The cross piece shown in Fig. 6 differs from the piece hereinbefore described by a very simple construction, in that the portion 1a corresponding to the tubular portion 1 in the foregoing embodiment is obtained by rolling-in by cold working the lower portion of the longitudinal flange 2 again designated by reference numeral 2. In this embodiment, no lug is necessarily provided for fastening the rear mud guard, but could of course be provided either by welding or brazing as has been indicated.

In the embodiment illustrated in Figs. 7–9 the connecting bridge is constituted by an elongated plate 2b. This plate is provided with three openings 4, 5 and 6 corresponding to the borings 4, 5, 6, 7 in the first embodiment, and with a lug 3b welded to this plate 2b and provided with an opening 8. The elongated plate 2b is welded with its ends directly to the rear fork arms A, B of the bicycle frame.

I claim:

1. The combination of a bicycle frame, having a rear wheel fork and a reinforcing shoulder cross piece extending transversally with respect to the central longitudinal axis of the frame and connecting the two fork arms of said rear wheel fork, with a luggage carrier comprising an elongated frame closed in itself, one transverse leg of said luggage-carrier frame extending parallel to said cross piece and being supported on the latter, corresponding borings being provided in said transverse leg of the luggage carrier frame and in said cross piece, said borings being adapted to receive bolts extending in a parallel plane to the central longitudinal axis of the bicycle frame for removably securing said luggage carrier to said bicycle frame, said cross piece being cold-worked from one piece and comprising a tubular portion and an upper flange being provided with said borings serving to secure said leg of the luggage carrier frame, and said tubular portion being provided with a central boring extending parallel to the longitudinal axis of the vehicle frame and serving to secure a rear wheel rim brake, a lug serving to removably connect a rear wheel mud guard being secured to said tubular element so as to project angularly therefrom, said tubular portion and said longitudinal flange being directly and rigidly secured to said fork arms of the rear wheel fork by a seam connection.

2. The combination of a bicycle frame with a luggage carrier as set forth in claim 1, wherein said lug for connecting the rear wheel mud guard with the bicycle frame is secured tangentially to the bottom of the tubular portion of the said shoulder cross piece.

3. The combination of a bicycle frame with a luggage carrier, as set forth in claim 2, wherein said flange of the cross piece extends tangentially to the tubular portion.

4. The combination of a bicycle frame, having a rear wheel fork and a reinforcing shoulder cross piece extending transversally with respect to the central longitudinal axis of the bicycle frame and connecting the two fork arms of said rear wheel fork, with a luggage carrier comprising an elongated frame closed in itself, one transverse leg of said luggage-carrier frame extending parallel to said cross piece and being supported on the latter, said cross piece being constituted by a plate welded with its ends to said fork arms and being provided in its upper portion with borings corresponding with borings in said transverse leg of the luggage carrier frame, said borings being adapted to receive bolts extending in a parallel plane to the central longitudinal axis of the bicycle frame for removably securing said luggage carrier to said bicycle frame, said plate further carrying a lug angularly projecting therefrom and serving to removably connect a rear wheel mud guard with the vehicle frame, a further boring being provided in the lower portion of said plate for securing to the latter a rear wheel rim brake, the width of the plate being such that the distance between the borings for fastening the luggage-carrier frame thereto and the boring receiving the rim brake may be made sufficient to permit good operation of said rim brake.

5. The combination of a bicycle frame, having a rear wheel fork and a shoulder cross piece connecting the two fork arms of said rear wheel fork, with a luggage carrier comprising an elongated frame closed in itself, said shoulder cross-piece having an upwardly directed plane portion constituting a flange, one transverse leg of said luggage-carrier frame extending parallel to said cross piece and to said flange and being supported on and releasably secured to the latter by means of bolts extending in a parallel plane to the central longitudinal axis of the bicycle frame for removably securing said luggage carrier to said bicycle frame, said shoulder cross piece being made of one piece with the flange portion provided with borings serving to secure said transverse leg of the luggage carrier and with its bottom rolled-in to constitute a tubular-shaped element, said tubular element and said flange being directly and rigidly fixed by a seam connection to the fork arms of the rear wheel fork.

References Cited in the file of this patent

UNITED STATES PATENTS

| 511,405 | Cable | Dec. 26, 1893 |
| 600,364 | Hill | Mar. 8, 1898 |
| 1,375,752 | Green | Apr. 26, 1921 |

FOREIGN PATENTS

| 739,683 | Germany | Oct. 1, 1943 |
| 819,653 | Germany | July 8, 1949 |
| 675,533 | Great Britain | July 9, 1952 |
| 82,755 | Sweden | Feb. 26, 1935 |